Patented Nov. 14, 1922.

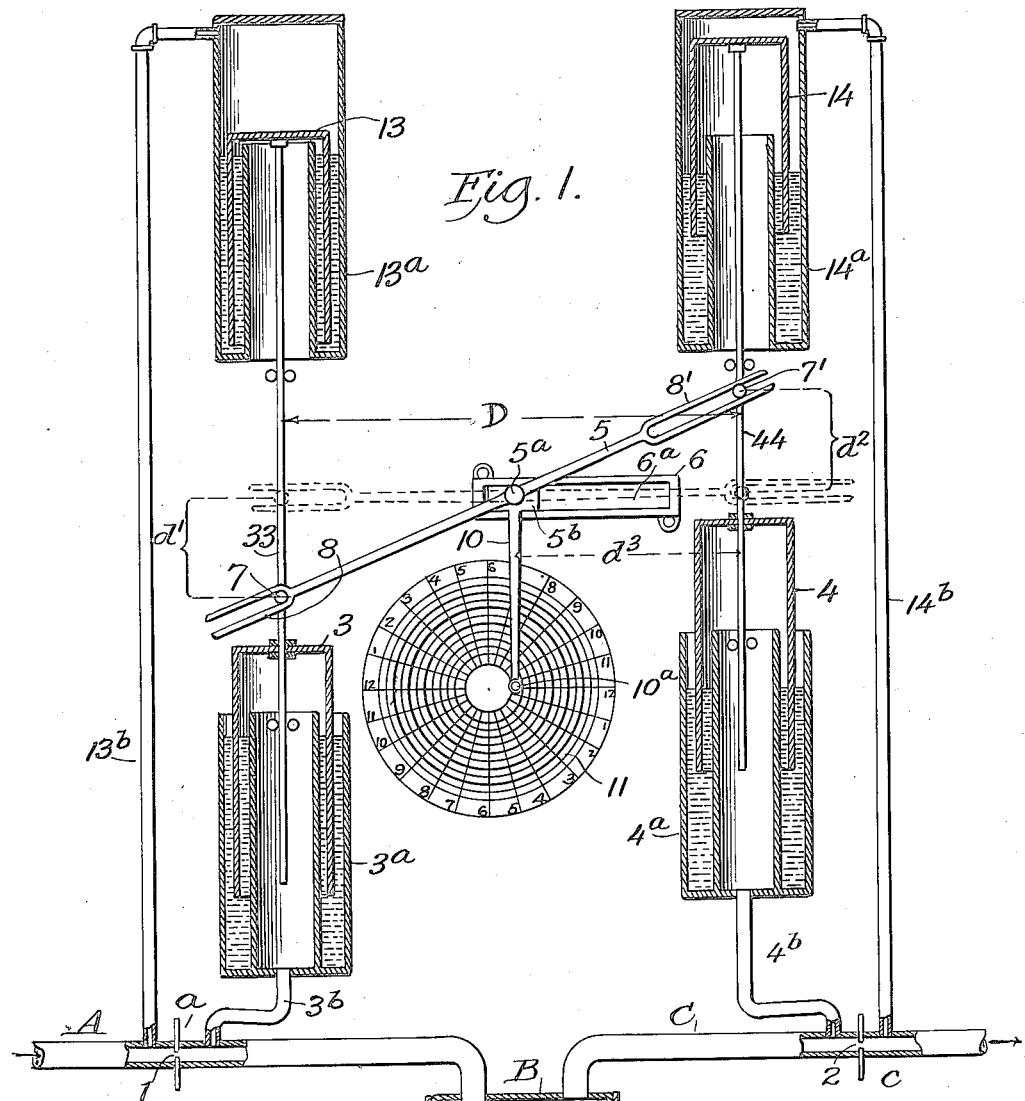
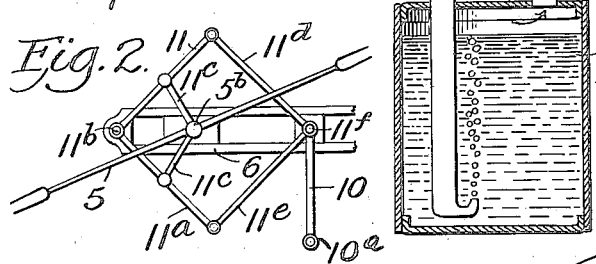
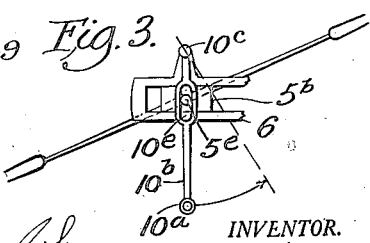

1,435,846

UNITED STATES PATENT OFFICE.

JOHN WEBB HOGG, OF NORRISTOWN, PENNSYLVANIA.

VOLUMETRIC GAS-ANALYZING APPARATUS.

Application filed January 9, 1922. Serial No. 528,056.

*To all whom it may concern:*

Be it known that I, JOHN W. HOGG, a citizen of the United States, residing at Norristown, in the county of Montgomery and State of Pennsylvania, have invented certain new and useful Improvements in Volumetric Gas-Analyzing Apparatus; and I hereby declare that the following is a full, clear, and exact description thereof, reference being had to the accompanying drawings, which form part of this specification.

This invention is what I term a volumetric gas analyzing apparatus and its object is to provide a novel device for determining the volumetric difference in gaseous mediums before and after being subjected to or passed through an absorbing medium. In brief the apparatus comprises an absorption chamber, two flow meters, for differential pressure devices; one measuring the gas before absorption and the other measuring the gas after absorption, and a proportional recording device so connected with and operated by the two flow meters as to make a visual record which will be proportional to the fraction or per cent of the original gas absorbed in the absorption chamber which is connected to and between the two flow meters.

I will explain the invention with reference to the accompanying drawings in which I have illustrated diagrammatically and conventionally one form of apparatus embodying the invention, and which in connection with the description will enable others skilled in the art to understand adopt and use the invention. In the claims following the description I have summarized the essentials of the invention and novel features of construction and arrangements of parts for which protection is desired.

Fig. 1 is a diagrammatic conventional illustration of a complete apparatus embodying the invention;

Fig. 2 is a modified form of recording arm link.

Fig. 3 is another modified form of recording arm link.

In the form of apparatus illustrated in Fig. 1, A is a supply pipe for the gas by which the gas is conducted into an absorption chamber B, which may be the interior of a suitable vessel B, said pipe extending downwardly into the chamber and below the surface of a suitable absorbing medium 9 in said chamber B. The gas rises through the absorbing material 9 in said chamber B and escapes into a pipe C by which it is conducted to the point of storage or utilization or blown to atmosphere (not shown). In passing through the absorbing material 9 certain contents of the gas will be absorbed; and the object of this invention is to determine and record the amount of contents absorbed, and to enable this to be recorded continuously.

For this purpose the pipes A and C are respectively connected adjacent the chamber B with flow meters and these flow meters are connected with a recording mechanism adapted to operate as hereinafter described. The principles involved are susceptible to a wide variation and therefore I do not consider the invention restricted to the mechanical features or details of construction shown in the accompanying drawing. In the form of apparatus shown, the flow meter connected with pipe A comprises upper and lower bells 3 and 13 which are connected by a rod 33. The mouth of the bell 3 is sealed in a tank $3^a$, open at its upper end and closed at the bottom, so the gas will be retained in the bell 3. The bell 13 is sealed by a tank $13^a$, the outer wall of which extends above the bell 13 and forms a gas chamber above the bell. In the construction shown the bells 3 and 13 are arranged vertical, and one above the other, so that the pressure on the bell 3 will oppose the pressure on the bell 13, or the pressure of gas in the tank $3^a$ will oppose the pressure in the tank $13^a$. The tank $13^a$ is connected above the bell 13 with a pipe A by a small pipe $13^b$, and the tank $3^a$ is connected with the pipe A by a small pipe $3^b$. Between the points of connection of the pipes $13^b$ and $3^b$ with the pipe A is an orificed partition $a$ provided in pipe A, said orifice $a$ having an aperture 1 of such size as will cause a difference in gas pressure in pipe A at opposite sides of said partition, such difference in pressure or flow of gas in the pipe A causing a like difference of pressure in the tanks $3^a$ and $13^a$. This difference of pressure is utilized as hereinafter described for operating a recording device.

Opposite the tanks $3^a$, $13^a$ are a like pair of similar tanks $4^a$, $14^a$, in which are bells 4 and 14 corresponding to bells 3 and 13, the bell 14 being sealed in the tank 14ᵃ and the bell 4 being sealed in the tank 4ᵃ. The bells 4 and 14 are connected by a rod 44 so that they must move in unison. The gas pressures in the tanks 4ᵃ and 14ᵃ upon the respective bells, cause the bells to oppose each other. The tank 4ᵃ is connected by a small pipe 4ᵇ with the pipe C; and the tank 14ᵃ is also connected above bell 14 by a pipe 14ᵇ with the pipe C. In the pipe C between the connections of the pipes 4ᵇ and 14ᵇ therewith is an orificed partition $c$ (corresponding to the partition $a$, in pipe A) and having an orifice 2 therein which will produce a difference of gas pressure in pipe C at opposite sides of said partition $c$. I have merely indicated in the drawings partitions $a$, $c$, in pipes A and C, by "partitions" I include any suitable mechanical devices which will obstruct the flow of gases in the pipe A between the pipes 13ᵇ and 3ᵇ, and in the pipe C between the pipes 4ᵇ and 14ᵇ.

The bells 3 and 13 should be so proportioned that when the gas pressures in the tanks 3ᵃ, 13ᵃ are equal the bells will stand in normal position and there will be no movement thereof; but if the pressure in the tank 3ᵃ should decrease then the bells and rod 33 would descend. If the pressure in the tank 13ᵃ should become less than that in the tank 3ᵃ, the bells and the rod 33 would rise. Similarly the bells 4 and 14 are so proportioned that if the pressures in the tanks 4ᵃ, 14ᵃ are equal there would be no movement of the bells and rod 44; but if the pressure in one tank 4ᵃ or 14ᵃ decreases the bells and rod 44 will be moved until the pressure is balanced. The rod 33 will move only in event of variation of the relative pressures in the pipe A at opposite sides of the orifice 1, and the rods 44 will move only in event of variation in the relative pressures in pipe C at opposite sides of the orifice 2.

The movements of the rods 33 and 44 are utilized to operate an indicating recording device of any suitable construction. In the construction indicated a lever 5 is pivoted at 5ᵃ on a slidable carrier 5ᵇ mounted to move horizontally in a slot 6ᵃ in a guide 6, which is supported in any suitable manner between the rods 33 and 44. The carrier 5ᵇ should be capable of moving freely in the slot 6ᵃ in the guide 6, and said slot 6ᵃ should be at right angles to the line of movement of the rods 33 and 44. The carrier 5ᵇ might be mounted on ball bearings in the slot, if desired or in any other suitable manner.

The ends of the lever 5 are preferably slotted or forked as at 8, 8' respectively. The slotted portion 8 of the lever 5 has a free sliding engagement with a pin or roller 7 on rod 33; and the slot 8' of lever 5 has a free sliding engagement with a pin or roller 7' or rod 44. The distance between the slotted or forked ends 8, 8' should be such that the lever will not bind between pins 7, 7' when lever 5 is in a horizontal position.

Attached to the carrier 5ᵇ is a depending finger 10 which carries a marker 10ᵃ of any suitable construction which is adapted to engage a suitable recording chart 11, which may be rotated by clockwork. While I have shown a circular chart any other form of chart may be employed which will be moved in regular time and uniform speed, and wherein the line traced by the marker 10ᵃ will show any variations of movement of the point 10ᵃ due to movement of the carrier 5ᵇ.

In Fig. 1 the marker 10ᵃ is shown directly connected to an arm 10 on the carrier 5ᵇ. If the apparatus were made of very small size the amount of movement of the carrier 5ᵇ might be so small as to make it difficult to read the variations in per cent on the chart. In such cases the movement of the marker 10ᵃ might be amplified by any suitable means.

As diagrammatically illustrated in Fig. 2 a pair of levers 11, 11ᵃ may be pivoted at 11ᵇ to the guide 6 and connected at their midpoints by links 11ᶜ to the carrier 5ᵇ; a pair of links 11ᵈ and 11ᵉ are respectively connected to the outer ends of the links 11, 11ᵃ and pivoted together as at 11ᶠ, and to the point 11ᶠ member 10 is attached; by this arrangement a slight horizontal movement of the carrier 5ᵇ will cause a greatly amplified movement of the marker 10ᵃ.

In the construction indicated in Fig. 3, the member 10ᵇ, carrying the pen 10ᵃ, instead of being fixed to the carrier 5ᵇ, is pivoted at 10ᶜ on the guide 6 above the carrier, and has a slot 10ᵉ engaged by a pin 5ᵉ on the carrier 5ᵇ. As the pin 5ᵉ is much nearer the pivot 10ᶜ than the marker 10ᵃ, a slight movement of the carrier 5ᵇ will cause a greatly amplified movement of the pen 10ᵃ.

The particular construction of the chart and means for operating the marker 10ᵃ form no feature of the present invention, and various forms of recording apparatus now in use can be readily adapted for use in connection with the flow meters, for the purpose described, and I do not consider my invention restricted to any particular construction of the registering devices, or means for operating the chart or marker.

It may be assumed that in the normal position of the parts the lever 5 is horizontally disposed as in position indicated in dotted lines in Fig. 1. (The lever being shown in one extreme position in full lines in Fig. 1). With no gas flow through the machine the lever 5 will remain horizontal or in normal position since there is then no different pressure on either flow meter.

In Fig. 1 the total possible deflection $d^2$ of flow meter 4—14 is shown as equal to that $d'$ of the flow meter 3—13. This is the natural zero position of the recorder since this condition is obtained only where there is no gas absorbed in chamber 9 and hence the differential pressure is the same on each flow meter. Therefore the deflection $d^2$ is always equal to or less than $d'$.

The flow meter 3—13 measures the gas before absorption; and the flow meter 4—14 measures the gas after absorption, the chamber B with absorbing medium being connected between the two flow meters. The deflection of one flow meter (or differential pressure device) connected across orifice is to be in one direction (up or down) and the deflection of the other flow meter (or differential pressure device) to be in the opposite direction (down or up) the meters and pressure connections being properly made to effect this.

The lever (5) which makes sliding contact with the rods of the flow meters is pivoted at its centre on the carrier $5^b$ or other mechanical device, as near frictionless as possible, which is constrained to move only in a horizontal plane and its pen or marker $10^a$ connected to this pivot (or through a multiplier) makes a graphic record on chart 11. The gas may be either forced or sucked through the pipe A, vessel B, and pipe C by any suitable means.

The forked ends 8, 8' are free to slide back and forth on pins 7, 7' of the flow meter rods 33 and 44 for any position each or both may assume. Assuming that one flow meter rod is stationary we may regard that end of the lever 5 as a fulcrum and that the other end is the handle of a lever which can be raised or lowered and the center of the lever being pivoted on a slidable device is constrained to move only in a horizontal plane. The action would be as follows:—

The flow meter (or differential pressure device) 3—13 is connected across orifice 1, and therefore measures the gas entering the apparatus. The high pressure and low pressure connections are so made as to give a deflection of distance $d'$ (either up or down from the horizontal position) the square root of which is proportional to the gas intake to the apparatus. Since the distance $d_1$ is proportional to the differential head across orifice 1 we have the following equations:—

$$Q_1 = K_1 \sqrt{h_1}$$

(or putting in the value $d_1$)—

$$Q_1 = K_1 \sqrt{d_1}$$

Assume that while the machine is operating the per cent of absorbable gas becomes greater and the flow through the right hand orifice decreases the deflection of the right hand flow meter will be less and it will tend to drop (not deflect so far) in doing so it will create a force vertical $f'$ downward. Since this is a sliding contact the force that the lever will receive will be perpendicular to the axis of the lever 5. This force is $(f_2)$. The force $f_2$ acting on the lever with (7) as a fulcrum will create a force $(f_3)$ at the point $(5^a)$ of about twice the magnitude of force $f_2$. This force acts against the guides (6) and may be resolved into two components, one $(f_4)$ perpendicular to the slot $(6^a)$ and one $(f_5)$ at right angles to $(f_4)$ and in line with the axis of a slot $6^a$. The recording mechanism will then move to the right showing a greater per cent of gas absorbed and recording same on the chart.

The flow meter (or differential pressure device) 4—14 measures the gas flow $Q_2$ by the orifice 2 after the absorption has taken place in the chamber 9. The high pressure and low pressure connectors are made so that the deflection distance $d_2$ from the horizontal plane is in the opposite direction from that of flow meter 3—13. The equation of this flow (following the same reasoning as for flow meter 3—13) is as follows:—

$$Q_2 = K_2 \sqrt{d_2}$$

The proportional marker $10^a$ of the recording device is operated by lever 5, which is shifted by and according to the movements of rods 33 and 44 of the flow meters and makes a graphic record on chart 11 of the per cent of gas absorbed.

The flow of gas through the apparatus may be either induced by suction or forced through by pressure and if necessary suitable means used to maintain the gas at the same temperature during the measurement and absorption.

The per cent of gas absorbed $$P = 100 \frac{(Q_1 - Q_2)}{Q_1}$$

or $$P = 100 \left(1 - \frac{Q_2}{Q_1}\right)$$

Putting in values of $Q_1$ and $Q_2$ we have $$P = 100 \left(1 - \frac{K_2 \sqrt{d_2}}{K_1 \sqrt{d_1}}\right).$$

Now the expression $\frac{K_1}{K_2}$ will be a constant for a given set of conditions. Let it equal K.

Solving the above:

$$\frac{d_2}{d_1} = k^2 \left(1 - \frac{P}{100}\right)^2$$

or $$d_2 = K^2 \left(1 - \frac{P}{100}\right)^2 d_1 \quad\text{—(I)}$$

Therefore for a given per cent of gas absorbed the ratios of the deflections are constant. Referring to the sketch due to similar triangles $$\frac{d_2}{d_1}=\frac{d_3}{D-d_3} \quad \text{---(II)}$$

Combining equations (I) and (II)—

$$\frac{d_3}{D-d_3}=K^2\left(1-\frac{P}{100}\right)$$

Therefore for a given per cent of gas absorbed $$\frac{d_3}{D-d_3}$$

is a constant quantity.

As stated the drawings are merely diagrammatic, illustrating the general principles of construction, and changes could be made in the character of construction of the flow meters, reording device, and absorbing chamber, within the scope of the invention.

What I claim is:

1. Volumetric gas analyzing apparatus comprising, an absorption chamber; means for conducting gases to said chamber; means for conducting gases from said chamber; means for establishing differential pressure of the gas in said means for conducting gases to said chamber; means for establishing differential pressure of gas in said means for conducting gases from said chamber; a flow meter having members respectively subjected to different gas pressures in the means for conducting gases to said chamber; a flow meter having members respectively subjected to different gas pressures in the means for conducting gases from said chamber; and indicating or recording means operatively connected with the respective flow meters, substantially as described.

2. In volumetric gas analyzing apparatus; an absorption chamber; means for conducting gases to said chamber; means for conducting gases from said chamber; means for establishing differential pressure of the gas in said means for conducting gases to said chamber; means for establishing differential pressures of gas in said means for conducting gases from said chamber; a flow meter having opposed members respectively subjected to different gas pressures in the means for conducting gases to said chamber; a flow meter having opposed members respectively subjected to different gas pressures in the means for conducting gases from said chamber; means operatively connected with the respective flow meters so as to be shifted thereby; and a recording member or indicator connected with said latter means.

3. Volumetric gas analyzing apparatus comprising, an absorption chamber; a supply pipe for conducting gases to said chamber; means for establishing differential gas pressures in said supply pipe; a discharge pipe from said chamber, means for establishing differential gas pressures in said discharge pipe; a flow meter subjected to the differences in pressure in the supply pipe, a flow meter subjected to differences in pressure in the discharge pipe, and a recording member or marker operatively connected with the respective flow meters.

4. Volumetric gas analyzing apparatus; comprising, an absorption chamber; a supply pipe for conducting gases to said chamber; means for establishing differential gas pressures in said pipe; a discharge pipe from said chamber, means for establishing differential gas pressures in said discharge pipe; a flow meter subjected to the differences in pressure in the supply pipe, a flow meter subjected to differences in pressure in the discharge pipe; and means operatively connected with the respective flow meters so as to be shifted thereby, and a recording member or marker connected with said latter means.

5. Volumetric gas analyzing apparatus comprising; an absorption chamber; a supply pipe for conducting gases to said chamber; means for establishing differential gas pressures in said pipe; a discharge pipe from said chamber, means for establishing differential gas pressures in said discharge pipe; a flow meter having opposed members respectively subjected to different pressures in the supply pipe; a flow meter having opposed members respectively subjected to different pressures in the discharge pipe; and means operatively connected with the respective flow meters so as to be shifted thereby, and a recording member or marker connected with said means.

6. Volumetric gas analyzing apparatus comprising, an absorption chamber; a supply pipe for conducting gases to said chamber; means for establishing differential gas pressures in said pipe; a discharge pipe from said chamber; means for establishing differential gas pressures in said discharge pipe; a flow meter subjected to the differences in pressure in the supply pipe, a flow meter subjected to differences in pressure in the discharge pipe, operatively connected with the respective flow meters so as to be shifted thereby, and a recording member or marker connected with said lever.

7. Volumetric gas analyzing apparatus comprising, an absorption chamber; a supply pipe for conducting gases to said chamber; means for establishing differential gas pressures in said pipe; a discharge pipe from said chamber, means for establishing differential gas pressures in said discharge pipe; a flow meter subjected to the differences in pressure in the supply pipe, a flow meter subjected to differences in pressure in the discharge pipe, a lever operatively connected with the respective flow meters so as to be shifted thereby, and a recording member or marker connected with said latter lever, and means constraining said marker to move in a substantially straight line, substantially as described.

8. Volumetric gas analyzing apparatus comprising, an absorption chamber; a supply pipe for conducting gases to said chamber; means for establishing differential gas pressures in said pipe; a discharge pipe from said chamber, means for establishing differential gas pressures in said discharge pipe; a flow meter having opposed members respectively subjected to the different pressures in the supply pipe, a flow meter having opposed members respectively subjected to the different pressures in the discharge pipe; and a lever operatively connected with the respective flow meters so as to be shifted thereby, a recording member or marker connected with said lever and means constraining said marker to move in a substantially straight line, substantially as described.

9. In volumetric gas analyzing apparatus; an absorption chamber; a supply pipe for conducting gases to said chamber; a perforated partition in said pipe for establishing different gas pressures therein; a discharge pipe from said chamber; a perforated partition in said pipe for establishing different gas pressures therein; a flow meter having opposed members connected with the supply pipe respectively at opposite sides of the partition; a flow meter having opposed members connected with the discharge pipe respectively at opposite sides of the partition therein, and a recording or marking means operatively connected with the members of the respective flow meters so as to be shifted thereby.

10. In volumetric gas analyzing apparatus, an absorption chamber; a supply pipe for conducting gases to said chamber; a perforated partition in said supply pipe for establishing differential gas pressures therein; a discharge pipe from said member, a perforated partition in said discharge pipe for establishing differential gas pressures therein; a flow meter having opposed members respectively connected with the supply pipe at opposite sides of the partition therein; a flow meter having opposed members respectively connected with the discharge pipe at opposite sides of the partition therein; a lever operatively connected with the respective flow meters so as to be shifted thereby, and a recording member or marker connected with said lever.

In testimony that I claim the foregoing as my own, I affix my signature.

JOHN WEBB HOGG.